United States Patent
Kourtakis et al.

(10) Patent No.: US 6,686,310 B1
(45) Date of Patent: Feb. 3, 2004

(54) HIGH SURFACE AREA SOL-GEL ROUTE PREPARED HYDROGENATION CATALYSTS

(75) Inventors: Kostantinos Kourtakis, Swedesboro, NJ (US); Daniel Campos, Wilmington, DE (US); Leo Ernest Manzer, Wilmington, DE (US)

(73) Assignee: E. I. du Pont de Nemours and Company, Wilmington, DE (US)

( * ) Notice: Subject to any disclaimer, the term of this patent is extended or adjusted under 35 U.S.C. 154(b) by 0 days.

(21) Appl. No.: 09/869,631

(22) PCT Filed: Feb. 8, 2000

(86) PCT No.: PCT/US00/03175

§ 371 (c)(1),
(2), (4) Date: Jun. 28, 2001

(87) PCT Pub. No.: WO00/47319

PCT Pub. Date: Aug. 17, 2000

Related U.S. Application Data

(60) Provisional application No. 60/119,255, filed on Feb. 9, 1999.

(51) Int. Cl.$^7$ .................................................. B01J 23/00
(52) U.S. Cl. ........................ 502/325; 502/234; 502/308; 502/309; 502/311; 502/339
(58) Field of Search .................................. 502/234, 308, 502/309, 311, 325, 339

(56) References Cited

U.S. PATENT DOCUMENTS 5,478,952 A * 12/1995 Schwartz ..................... 549/325
6,235,677 B1 * 5/2002 Manzer et al. .............. 502/232

FOREIGN PATENT DOCUMENTS

GB          2 245 557 A   *   1/1992

* cited by examiner

Primary Examiner—Bernard Dentz

(57) ABSTRACT

This invention concerns novel compositions, useful as hydrogenation catalyst, said compositions comprising metals and metal ions such as ruthenium (Ru) or palladium (Pd) dispersed in and distributed throughout a matrix comprising an inorganic or silicon oxide network. The catalyst may be prepared by the sol-gel method; a solution of at least one catalytic metal compound is added to a solution of at least one metal alkoxide selected from Al, Ti, Nb, Zr, Ta, Si and other inorganic alkoxides, and then gelling the mixture. Promotors such as rhenium (Re), molybdenum (Mo) and tin (Sn) may be added. The catalyst may be used in the reduction of metallic acid or gamma-butyrolactone to tetrahydrofuran (THF) and 1,4-butanediol (BDO).

2 Claims, No Drawings

HIGH SURFACE AREA SOL-GEL ROUTE PREPARED HYDROGENATION CATALYSTS

This application is a 371 of PCT/US00/03175 filed Feb. 8, 2000, which claims the benefit of Provisional Application No. 60/119,255 filed Feb. 9, 1999.

FIELD OF THE INVENTION

This invention concerns novel compositions, useful as catalysts, said compositions comprising metals and metal ions, such as ruthenium (Ru) and palladium (Pd), incorporated in an inorganic matrix comprising an inorganic oxide network. Catalyst activity is enhanced versus analogous supported metal catalysts.

TECHNICAL BACKGROUND

E. I. Ko, in the Handbook of Heterogeneous Catalysis, ed. by G. Ertl et al, reviews generally the use of sol-gel processes for the preparation of catalytic materials. There is no disclosure of nor suggestion of ruthenium or rhenium containing catalysts.

U.S. Pat. No. 4,622,310 discloses inorganic phosphate aerogels. The utility stated is as porous inert carrier materials (supports) in polymerization and copolymerization processes. Use of the inorganic phosphates as supports for elements in groups VIB, VIIB and VIII of the Periodic Table is described. There is no disclosure nor suggestion of incorporating the elements within the inorganic phosphate gel matrix.

U.S. Pat. No. 4,469,816 discloses a catalyst composition comprising a uniform dispersion of individual metallic palladium particles impregnated onto, within and throughout an alumina aerogel support processes for the preparation of catalytic materials. There is no disclosure of nor suggestion of ruthenium or rhenium containing catalysts.

U.S. Pat. No. 5,538,931 discloses a process for preparing a supported catalyst comprising a transition metal selected from palladium, platinum, nickel, cobalt or copper on an aerogel support.

DE-A 195 30 528 and DE-A 195 37 202 disclose catalysts comprising ruthenium dispersed in titania and zirconia sol-gel matrices, respectively. No promotors or co-calalysts are described.

SUMMARY OF THE INVENTION

This invention provides catalyst precursor compositions comprising catalytic species dispersed in and distributed throughout a high surface area matrix wherein, the catalytic species is selected from the group consisting of ruthenium and palladium, in the optional presence of a promoter selected from the group consisting of rhenium, molybdenum and tin.

The high surface area matrix material may be an inorganic oxide network, optionally prepared by the sol-gel route.

This invention further provides catalyst compositions comprising the reduced form of the above catalyst precursor compositions.

The catalyst precursor composition may further include a promoter.

Preferred promoters are selected from the group consisting of Rhenium, Molybdenum and Tin.

This invention further provides improved processes for the reduction of maleic acid to tetrahydrofuran (THF) and 1,4-butanediol (BDO) and for the reduction of gamma butyrolactone to tetrahydrofuran and 1,4-butanediol, the improvement consisting of the use of the catalysts of the present invention.

DETAILED DESCRIPTION OF THE INVENTION

The present invention concerns novel catalyst compositions containing metals and metal ions, such as ruthenium (Ru) and palladium (Pd), incorporated into a matrix comprising inorganic oxides and oxyhydroxides of Ti, Nb, Ta, Zr and Si, Al, and others.

As used herein, the term matrix means a skeletal framework of oxides and oxyhydroxides derived from the hydrolysis and condensation of alkoxides and other reagents. The framework typically comprises 30% or more, by weight, of the total catalyst composition. As discussed below, porosity and microstructure can be controlled, in some cases, by synthetic parameters (i.e. pH, temperature), drying, and other heat conditioning. As used herein, the term microstructure means a description, both physical and chemical in nature, of the bonding of domains and crystallites with each other and their arrangement and physical appearance or morphology in a matrix or solid; this term also describes the structure and morphology, that is bonding and physical appearance, of the other active cationic precursors which are included in this invention.

The catalytic species are dispersed in and distributed throughout a high surface area matrix. Alternatively, the catalytic species may be referred to as being "matrix incorporated".

Certain promoter materials, for example rhenium (Re), molybdenum (Mo) and tin (Sn), may also be present. Typical preparations involve sol gel chemistry. It is understood that sol gel products can be typically incompletely condensed resulting in products bearing residual hydroxy or alkoxy groups.

The catalyst compositions of the present invention may be prepared by one step synthesis of alcogels in which hydrolyzable matrix precursors are used in the presence of soluble metal salts and promoters. This preparative process is characterized by adding a solution of at least one catalytic metal compound selected from the group consisting of ruthenium and palladium to a solution of at least one metal alkoxide, wherein the metal is selected from the group consisting of Al, Ti, Nb, Zr, Ta, Si and other inorganic alkoxides, and gelling the resulting mixture. The order of addition of reagents, nature of precursors and solvents and the nature of gelling agents may be varied widely. The term gelling agent means a reagent that causes or facilitates the formation of a gel. It may be acidic, basic or neutral, such as of water.

General compositional ranges for the catalyst precursors herein are Ru and Pd from 0.1 to 20 wt %; the promoters Re and Sn from 0 to 20 wt % with the balance being the matrix material.

A typical preparation involves the incorporation of Ru, Pd, Sn, Mo or Re salts, or mixtures thereof, in an alkoxide solution of aluminum, silicon, titanium, zirconium, tantalum or niobium. The hydrolysis of the alkoxides can either be acid or base catalyzed. Hydrolysis of the alkoxide precursors is accompanied by condensation reactions. Under the proper conditions (pH, gelling agent, reactant ratios, temperature, time, solvent and solvent concentration), these can result in the polymerization into an inorganic gel containing the desired catalytic species or precursors. In some cases, the catalytic species are either part of the polymerization network, or are entrapped within the network.

A consequence of this method is that higher metal dispersion and uniformity can be achieved in the inorganic oxide matrix than is normally attainable using more conventional synthetic methods.

The first step in the synthesis of gels consists of preparing solutions of the gel precursors, which may be, but are not limited to, alkoxides and other reagents and separate solutions containing protic solvents such as water. The alkoxide solutions are mixed with the solutions containing the protic solvents, and the alkoxides will react and polymerize to form a gel. The protic solvent can include water, with trace acid or base as catalyst to initiate hydrolysis. As polymerization and crosslinking proceeds, viscosity increases and the material can eventually set to a rigid "gel". The "gel" consists of a crosslinked network of the desired material which incorporates the original solvent within its open porous structure. The "gel" may then be dried, typically by either simple heating in a flow of dry air to produce an aerogel or the entrapped solvent may be removed by displacement with a supercritical fluid such as liquid $CO_2$ to produce an aerogel, as described below. Final calcination of these dried materials to elevated temperatures (>200° C.) results in products which typically have very porous structures and concomitantly high surface areas.

In the preparation of the catalysts of the present invention, the active metal precursors and promoters can be added to the protic or the alkoxide containing solutions. After gelation, the metal salt or complex is uniformly incorporated into the gel network. The gel may then be dried and heated to produce xerogel or aergoel materials, as described below.

Because of the synthetic technique and the physical appearance of the alcogels materials produced, it is clear that the precursor xerogels and aerogels contain active metals and promoters in a highly dispersed state. Further processing to produce the final catalytic material may include chemical reduction at low temperatures to produce the final highly dispersed material, or a combination of calcination cycles in various media, including hydrogen, to produce the final active catalyst. Activation of the material can be performed on stream, under reaction conditions.

In the practice of this invention one or more inorganic metal alkoxides or salts thereof may be used as starting material for preparing the gels. It is, however, preferred to utilize the metal alkoxides. The rhenium promoter can be added as perrhenic acid in water during the synthesis of the xerogel. It can also be post-added as $Re(CO)_5Cl$ to the hydrogenation reaction mixture during the reaction.

The inorganic metal alkoxides used in this invention may include any alkoxide which contains from 1 to 20 carbon atoms and preferably 1 to 5 carbon atoms in the alkoxide group, which are preferably soluble in the liquid reaction medium. In this invention, preferably, $C_1$–$C_4$ systems, ethoxides, n-butoxides or isopropoxides are used.

One of the criteria for the starting material are inorganic alkoxides or metal salts which will dissolve in the specified medium or solvent. Commercially available alkoxides can be used. However, inorganic alkoxides can be prepared by other routes. Some examples include direct reaction of zero valent metals with alcohols in the presence of a catalyst. Many alkoxides can be formed by reaction of metal halides with alcohols. Alkoxy derivatives can be synthesized by the reaction of the alkoxide with alcohol in a ligand interchange reaction. Direct reaction of dialkylamides with alcohol also forms alkoxide derivatives. The medium utilized in the process generally should be a solvent for the inorganic alkoxide or alkoxides which are utilized and the additional metal reagents and promoters which are added in the single step synthesis. Solubility of all components in their respective media (aqueous and non-aqueous) is preferred to produce highly dispersed materials. By employing soluble reagents in this manner, mixing and dispersion of the active metals and promoter reagents can be near atomic, in fact mirroring their dispersion in their respective solutions. The precursor xerogel thus produced by this process will be highly dispersed active metals and promoters. High dispersion results in precursor particles in the nanometer size range or smaller.

Generally, the amount of solvent used is linked to the alkoxide content. A molar ratio of 26.5 ethanol/total alkoxide is typically used, although a range of 5 to greater than 53 can be used. If a large excess of alcohol is used, gelation will not generally occur immediately; some solvent evaporation is needed. At lower solvent concentrations, it is contemplated that a heavier gel will be formed having less pore volume and surface area.

To prepare the catalysts of the present invention, water and any aqueous solutions are added in a dropwise fashion to the alcohol soluble alkoxide and other reagents, to induce hydrolysis and condensation reactions. Depending on the alkoxide system, a discernible gel point can be reached in minutes or hours. The molar ratio of the total water added (including water present in aqueous solutions), can vary according to the specific inorganic alkoxide being reacted.

Generally, a molar ratio of $H_2O$:alkoxide range of 0.1 to 20 is within the scope of this invention. However, ratios close to 5:1 for tantalum alkoxide, 4:1 for zirconium alkoxide and titanium alkoxides can be used. The amount of water utilized in the reaction can be that calculated to hydrolyze the inorganic alkoxide in the reaction mixture. A ratio lower than that needed to hydrolzye the alkoxide species will result in a partially hydrolyzed material, which in most cases will reach a gel point at a much slower rate, depending on the aging procedure and the presence of atmospheric moisture.

The addition of acidic or basic reagents to the inorganic alkoxide medium can have an effect on the kinetics of the hydrolysis and condensation reactions, and the microstructure of the oxide/hydroxide matrices derived from the alkoxide precursor which entraps or incorporates the soluble metal and promoter reagents. Generally, a pH range of 1–12 can be used, with a pH range of 1–6 preferred for these experiments.

After reacting to form the alcogels of the present invention, it may be necessary to complete the gelation process with some aging of the gel. This aging can range form one minute to over several days. In general, all alcogels were aged at room temperature in air for at least several hours.

The solvent in the gels can be removed in several different ways: conventional drying, freeze and vacuum drying, spray drying, or the solvent can be exchanged under supercritical conditions. Removal by vacuum drying results in the formation of a xerogel. An aerogel of the material can typically be formed by charging in a pressurized system such as an autoclave. The solvent laden gel which is formed in the practice of the invention is placed in an autoclave where it can be contacted with a fluid above its critical temperature and pressure by allowing supercritical fluid to flow through the solvent laden gel, so as to extract the solvent, until the solvent is no longer being extracted by the supercritical fluid. In performing this extraction to produce the aerogel material, various fluids can be utilized at their critical temperature and pressure. For instance, fluorochlorocarbons typified by Freon® brand fluorochloromethanes and ethanes, ammonia and carbon dioxide are all suitable for this process. Typically, the extraction fluids are fluids which are gases at atmospheric conditions, so that pore collapse due to the capillary forces at the liquid/solid interface are avoided during drying. The resulting material should, in most cases, possess a higher surface area than the non-supercritically dried materials.

The xerogels and areogels thus produced can be described as precursor salts incorporated into an oxide or oxyhydroxide matrix. The hydroxyl content is undefined at this point; a theoretical maximum corresponds to the valence of the central metal atom. Hence, $Ta_2(O_{2-x}(OH)_x)_5$ possesses a theoretical hydroxyl maximum at x=2. The molar $H_2O$:alkoxide ratio can also affect the final xerogel stoichiometry; in this case, if $H_2O:T_a<5$, there will be residual —OR groups in the unaged gel. However, reaction with atmospheric moisture will convert these to the corresponding —OH and —O groups upon continued polymerization and dehydration. Aging, even under inert conditions, can also affect the condensation of the —OH, eliminating $H_2O$, through continuation of crosslinking and polymerization, i.e., gel formation.

The materials of the present invention are useful in hydrogenation reactions. Specific examples include hydrogenation of maleic acid to tetrahydro-furan, butanediol and other products and hydrogenation of gamma butyrolactone into the same or similar products. For the latter case, additional rhenium (preferably used as rhenium carbonyl chloride) may be added to the hydrogenation reactions as co-catalyst. The compositions of the present invention are also useful for the reduction of 3-hydroxypropionaldehyde to 1,3-propane diol.

The experimental results obtained show the novelty and unexpected results of the current invention. In maleic acid hydrogenation, catalytic reactor tests show the titania and zirconia derived aerogel systems containing ruthenium and rhenium are very active for maleic acid hydrogenation to THF. The THF STY (space time yield, mol/hr-kg catalyst) of the matrix incorporated material in $ZrO_2$ shows at least a 3.5×increase in STY versus supported catalysts. In addition, the maleic acid conversion is increased 10 fold.

The improvement in the single step synthetic method is clearly demonstrated by comparing Example 4, 1 wt % Ru, 4 wt % Re in $ZrO_2$ aerogel with comparative Example 5, 1 wt % Ru, 4 wt % Re on preformed $ZrO_2$ aerogel, presoaked in water prior to impregnation, and comparative Example 6, prepared by impregnation, at incipient wetness, of ruthenium chloride and perrhenic acid on pre-formned $ZrO_2$ aerogel. Catalysts prepared by the process of this invention showed and STY of 44. 1, versus 12.9 and 4.3 for comparative Examples 5 and 6. The >350% increase in STY is accompanied by a ten-fold increase in % maleic acid conversion, as defined as follows:

conversion=(moles reactant initial-moles reactant final)/ (moles reactant initial)=(moles reactant converted)/(moles reactant initial).

This unexpected improvement is achieved when three components are added in a single step synthesis to produce the gel as compared to individual, sequential additions or impregnations on pre-formed supports, as described in the comparative examples.

The zirconia aerogel prepared by this matrix incorporation method is significantly more active than a comparable catalyst prepared by the more conventional method of supporting soluble Ru and Re on, for example, a preformed $ZrO_2$ aerogel.

A series of aerogels prepared at lower ruthenium loadings (1/3 wt %) show surprising activity for gamma butyrolactone (GBL) hydrogenation, especially when a soluble rhenium complex [$Re(CO)_5Cl$] is added with the aerogel catalyst.

Acid stability tests on titania and tantalum oxide aerogels, and reactor tests on all catalyst systems, have shown that these catalysts are essentially stable towards dissolution in liquid maleic acid.

Typical $N_2$ BET surface areas for these aerogel materials are several hundred $m^2/g$.

Zirconium n-propoxide, titanium n-butoxide, and tantalum and niobium ethoxides produce the highest quality gels when dissolved in ethanol.

In the data presented herein, THF is tetrahydrofuran, BDO is 1,4-butanediol, space time yield (STY) is defined as (mole THF+BDO product/hr-kg catalyst). Selectivity is defined as moles (THF+BDO)/mole (THF+BDO+ byproducts). Conversion herein is defined as (moles reactant converted)/(moles reactant initially present).

TABLE 1

Compositional, Reactor Data and Surface Area/Density for Maleic Acid Hydrogenation using Aerogel Catalysts

| Example No. | Composition | THF + BDO STY (mol/hr-kg) | molar selectivity (THF + BDO) | Bulk Density (Hg, g/cc) | Surface Area ($m^2/g$) |
|---|---|---|---|---|---|
| 1 | $Ta_2O_5$ aerogel | — | — | — | — |
|   | 0.057 wt % Ru, 0.023 wt % Re, $Ta_2O_5$ aerogel | 9.1 | 0.87 | 1.14 | 246 |
|   | (i) reduced in $H_2$/He | 11.2* | 0.88 | 1.51 | — |
|   | (ii) unreduced prior to use | 11.6 | 0.89 | — | — |
| 2 | 1 wt % Ru, 4 wt % Re, $Ta_2O_5$ aerogel | 25.5 | 0.83 | — | 224 |
| 3 | 1 wt % Ru, 4 wt % Re, $Nb_2O_5$ aerogel | 16.4 | 0.82 | — | — |
| 4 | 1 wt % Ru, 4 wt % Re, $ZrO_2$ aerogel | 44.1 | 0.30 | — | — |
| 5 [COMP.] | 1 wt % Ru, 4 wt % Re supported on preformed $ZrO_2$ aerogel presoaked in $H_2O$ prior to impregnation | 12.9 | 0.86 | — | — |
| 6 [COMP.] | 1 wt % Ru, 4 wt % Re supported on pre-formed $ZrO_2$ aerogel, prepared by incipient wetness | 4.3 | 0.68 | — | — |
| 7 | 1 wt % Ru, 4 wt % Re, $TiO_2$ cohydrolysis aerogel | 9.9 | 0.61 | — | — |
| 8 | Ru/Re/Sn $TiO_2$ aerogel | 4.3 | 0.71 | — | — |

*duplicate prepration

TABLE 2

Compositional, Reactor Data and Surface Area/Density for GBL Hydrogenation with and w/out added Re(CO)$_5$Cl
100 mg catalyst, 20 mg Re(CO)$_5$Cl, 250° C., 2,000 psi

| Example No. | Composition | Conversion GBL | THF selectivity | Bulk density (Hg, g/cc) | Surface area (m$^2$/g) |
|---|---|---|---|---|---|
| 9  | 1/3 wt % Ru Ta$_2$O$_5$ aerogel + Re(CO)$_5$Cl | 45.5 | 91.4 | 0.32 | 322 |
| 10 | 1/3 wt % Ru TiO$_2$ aerogel + Re(CO)$_5$Cl | 67.2 | 92.3 | — | 322 |
| 11 | 1/3 wt % Ru, 4/3 wt % Re ZrO$_2$ aerogel + Re(CO)$_5$Cl | 52.7 | 87 | — | 300 |
| 12 | 1/3 wt % Ru, 4/3 wt % Re, Nb$_2$O$_5$ aerogel | 26.3 | 18.2 | — | 465 |
| 13 | 1/3 wt % Ru, 4/3 wt % Re, TiO$_2$ aerogel | 10.1 | 95.1 | — | 547 |
| 14 | 1/3 wt % Ru, 4/3 wt % Re, Ta$_2$O$_5$ aerogel | 33.7 | 10.7 | — | 241 |
| 15 | 1 wt % Ru, 4 wt % Re Ta$_2$O$_5$ aerogel | 57.2 | 87 | — | 224 |

EXAMPLES

GENERAL PROCEDURES

Example 1

0.057 wt % Ru, 0.023 wt % Re in Tantalum Oxide Aerogel 12.18 ml of ethanol (Quantum Chemical, Newark, N.J. dehydrated, punctilious grade) was combined with 40.47 g of tantalum ethoxide, Ta(OEt)$_5$ (Aldrich, Milwaukee, Wis.) in an inert atmosphere N$_2$ drybox. In a separate container, 0.0303 g of ruthenium trichloride (Aldrich, Milwaukee, Wis.) was combined with 0.073 g of rhenium heptoxide (Re$_2$O$_7$, Aldrich, Milwaukee, Wis.), 8.25 g of water and 12.18 ml of additional ethanol. 1.03 ml of glacial acetic acid (J. T. Baker, Phillipsburg, N.J.) and 1.03 ml of 70 wt % nitric acid (EM Sciences, (Gibbstown, N.J.) were added to the water mixture. The aqueous solution containing the ruthenium chloride and rhenium oxide was added, in a dropwise fashion, to the tantalum alkoxide solution. After several minutes, a cloudy orange/semi-opaque gel formed. Aging at room temperature proceeded for several days prior to removal of solvent by supercritical CO$_2$. The material was placed in a stirred autoclave and extracted in CO$_2$ under supercritical conditions. CO$_2$ gas was purged over the catalyst for a period of 7 hours, at 40° C. and a pressure of 3500 psi. The material produced following the exposure was a free flowing powder. The sample was evaluated as prepared for hydrogenation reaction chemistry. No additional drying or calcination steps were performed.

Example 2

1 wt % Ru, 4 wt % Re, Tantalum Oxide Aerogel 123.04 ml of isobutyl alcohol (Aldrich) was combined with 81.25 g of tantalum ethoxide, Ta(OEt)$_5$ (Aldrich) in an inert atmosphere N$_2$ drybox. In a separate container, 0.9712 g of ruthenium trichloride (Aldrich) was combined with 2.42 of rhenium heptoxide (Re$_2$O$_7$, Aldrich), 18.15 g of water and 123.04 ml of additional isobutyl alcohol (Aldrich). 2.146 ml of glacial acetic acid (J. T. Baker) and 1.675 ml of 70 wt % nitric acid (EM Sciences) were added to the water mixture. The aqueous solution containing the ruthenium chloride and rhenium oxide was added, in a dropwise fashion, to the tantalum alkoxide solution. After several hours (72 hours), a dark brown, slightly opaque gel formed. Aging at room temperature proceeded after 12 days prior to removal of solvent by supercritical CO$_2$. The material was placed in a stirred autoclave and extracted in CO$_2$ under supercritical conditions. CO$_2$ gas was purged over the catalyst for a period of 7 hours, at 40° C. and a pressure of 3500 psi. The material produced following the exposure was a free flowing powder. The sample was evaluated as prepared for hydrogenation reaction chemistry. No additional drying or calcination steps were performed.

Example 3

1 wt % Ru, 4 wt % Re in a Niobium Oxide Aerogel 228.6 ml of ethanol (Quantum Chemical, Newark, N.J. dehydrated punctilious) was combined with 95.15 g of niobium ethoxide, Nb(OEt)$_5$ (Aldrich) in an inert atmosphere N$_2$ drybox. In a separate container, 0.9708 g of ruthenium trichloride (Aldrich) was combined with 2.1765 g of rhenium heptoxide (Re$_2$O$_7$, Aldrich), 26.934 g of water and 228.6 ml of additional ethanol. 3.208 ml of glacial acetic acid (J. T. Baker) and 2.506 ml of 70 wt % nitric acid (EM Sciences) were added to the water mixture. The aqueous solution containing the ruthenium chloride and rhenium oxide was loaded in a dropping funnel, and slowly added to a niobium alkoxide soluton which had been loaded into a 1 liter resin kettle with a three neck cap. The resin kettle and dropping funnel were purged with N$_2$ gas during the addition. After several minutes, a clear red-brown gel formed. Aging at room temperature proceeded for approximately 50 days prior to removal of solvent by supercritical CO$_2$. The material was placed in a stirred autoclave and extracted in CO$_2$ under supercritical conditions. CO$_2$ gas was purged over the catalyst for a period of 7 hours, at 40° C. and a pressure of 3500 psi. The material produced following the exposure was a free flowing powder. The sample was evaluated as prepared for hydrogenation reaction chemistry. No additional drying or calcination steps were performed.

Example 4

1 wt % Ru, 4 wt % Re in a Zirconium Oxide Aerogel 228.6 ml of ethanol (Quantum Chemical) was combined with 23.32 g of zirconium n-propoxide (70 wt % in n-propanol, (Alfa, Ward Hill, Mass.), in an inert atmosphere N$_2$ drybox. In a separate container, 0.9 g of ruthenium trichloride (Aldrich) was combined with 2.0178 g of rhenium heptoxide (Re$_2$O$_7$, Aldrich), 21.55 g of water and 228.6 ml of additional ethanol. 2.566 ml of glacial acetic acid and 2.004 ml of 70 wt % nitric acid were added to the water mixture. The aqueous solution containing the ruthenium chloride and rhenium oxide was added, in a dropwise fashion, to the tantalum alkoxide solution. The material was contained in a resin kettle, and was blanketed with flowing $N_2$. During the addition, a pink, thick opaque colloid forms. Some separation of the material into two layers was noted (opaque bottom layer and purple upper solution). The entire sample was aged for 40 days prior to solvent extraction using supercritical $CO_2$. $CO_2$ gas was purged over the catalyst in a stirred autoclave for a period of 7 hours, at 40° C. and a pressure of 3500 psi. A free flowing powder was produced. The sample was evaluated as prepared for hydrogenation reaction chemistry. No additional drying or calcination steps were performed.

Example 5 (Comparative)

1 wt % Ru, 4 wt % Re Supported on a Pre-formed Zirconium Oxide Aerogel

A zirconium oxide aerogel was prepared in the following manner. 382.21 ml of ethanol (Quantum Chemical) was combined with 46.797 g of zirconium n-propoxide (70 wt % in propanol, (Aldrich) in an inert atmosphere $N_2$ drybox. In a separate container, 7.206 g of water and 382.31 ml of additional ethanol were added to 0.858 ml of glacial acetic acid (J. T. Baker) and 1.03 ml of 10 0.67 ml of 70 wt % nitric acid (EM Sciences) were added to the water mixture. The aqueous solution containing the acetic and nitric acids was added, in a dropwise fashion, to the zirconium alkoxide solution. The entire apparatus was blanketed with inert nitrogen. A gel point could be determined after approximately 8 hours, after allowing some ethanol solvent to slowly evaporate. A clear gel formed having a very faint yellow tint. The material was aged for several days at room temperature prior to solvent extraction. The material was placed in a stirred autoclave and extracted in $CO_2$ under supercritical conditions. $CO_2$ gas was purged over the catalyst for a period of 7 hours, at 40° C. and a pressure of 3500 psi. The material produced following the exposure was a free flowing powder. Approximately 10 g of the aerogel powder was additionally calcined at 120° C. air, overnight.

3 g of the sample was soaked in 3 ml of distilled water at room temperature for 18 hours. A solution of 0.7 g of Ruthenium Chloride ($RuCl_3$ 1.095 $H_2O$, Aldrich) and 0.164 g of rhenium heptoxide (Aldrich), and 3 grams of water were slowly added to the water-soaked aergel. After stirring, the mixture was dried at 120° C. in air overnight, with frequent stirring until dried. 2.92 g of solid material was recovered. The dried powder was reduced in a $H_2$/He mixture to activate the catalyst. 2.90 g of the aerogel was added to a quartz boat. The sample was purged with 500 sccm $N_2$ gas at room temperature for 15 minutes, and was then heated to 150° C. and held at 150° C. for 1 hr. At this point, 100 sccm of $H_2$ gas was added to the gas mixture, and the material reduced at 150° C. The sample was then heated to 300° C. for 8 hrs in the $H_2$/He mixture. Prior to cooling, the sample was purged for 30 minutes with flowing B2 The aerogel was then passivated, to prevent reaction with air upon removal, by flowing 1.5% $O_2$ in $N_2$ over the catalyst at room temperature for 30 minutes. (Final sample weight was 2.55 g, following this procedure).

Example 6 (Comparative)

1 wt % Ru, 4 wt % Re Supported on Pre-formed $ZrO_2$ Aerogel

Another portion of the same zirconium aerogel as prepared in Example 5 was used for this example. The aerogel was dried overnight for 18 hrs at 120° C. Ruthenium chloride and rhenium heptoxide were impregnated by incipient wetness. A pore volume of about of 0.5 cc/g was not exceeded during these impregnations.

In a 20 ml vial, a solution containing 0.071 g of Ruthenium Chloride ($RuCl_3$ 1.095 $H_2O$, Aldrich) and 0.164 g of rhenium oxide ($Re_2O_7$, Aldrich) was prepared in 1.5 ml of $H_2O$. To this solution, 3 grams of the zirconium aerogel described above was added. The material was allowed to stand at room temperature, for 1 hour, with occasional stirring. The material was additionally dried at 120° C. in aiovernight with frequent stirring, until dry.

Reduction Schedule

A catalyst reduction/activation procedure, identical to that described in previous example, was used. The dried powder was reduced in a $H_2$/He mixture to activate the catalyst. 2.24 g of the aerogel was added to a quartz boat. The sample was purged with 500 sccm $N_2$ gas at room temperature for 15 minutes, and was then heated to 150° C. and held at 150° C. for 1 hr. At this point, 100 sccm of $H_2$ gas was added to the gas mixture, and the material reduced at 150° C. The sample was then heated to 300° C. for 8 hrs in the $H_2$/He mixture. Prior to cooling, the sample was purged for 30 minutes with flowing $H_2$. The aerogel was then passivated, to prevent reaction with air upon removal, by flowing 1.5% $O_2$ in $N_2$ over the catalyst at room temperature for 30 minutes. (Final sample weight was 2.02 g, following the reduction procedure).

Example 7

1 wt % Ru, 4 wt % Re in a Titanium Oxide Aerogel 305.85 ml of ethanol was combined with 136.14 g of titanium n-butoxide (Aldrich) in an inert atmosphere $N_2$ drybox. In a separate vessel, 0.7561 g of ruthenium trichloride (Aldrich) was combined with 1.75 g of rhenium heptoxide ($Re_2O_7$, Aldrich), 28.824 g of water and 305.85 ml of additional ethanol. 3.43 ml of glacial acetic acid (J. T. Baker) and 2.681 ml of 70 wt % nitric acid (EM Sciences) were added to the water mixture with stirring. The aqueous solution containing the ruthenium chloride and rhenium oxide was added, in a dropwise fashion, to the titanium alkoxide solution. Gellation occurred after twenty four hours, at which point a clear, amber colored gel formed. Aging at room temperature proceeded after several days prior to removal of solvent by supercritical $CO_2$. The material was placed in a stirred autoclave and the solvent was extracted using $CO_2$ held under supercritical conditions. $CO_2$ gas was purged over the catalyst for a period of 7 hours, at 40° C. and a pressure of 3500 psi. The material produced following the exposure was a free flowing powder. The sample was evaluated as prepared for hydrogenation reaction chemistry. No additional drying or calcination steps were performed.

Example 8

1.5 wt % Ru, 3 wt % Re, 0.6 wt % Sn in $TiO_2$ Aerogel 229.39 ml of ethanol was combined with 102.108 g of titanium n-butoxide (Aldrich) and 0.2421 g $SnCl_2$ (Alfa A16202, anhydrous, Ward Hill, Mass.) in an inert atmosphere $N_2$ drybox. In a separate container, 0.8515 g of ruthenium trichloride (Aldrich) was combined with 0.9856 g of rhenium heptoxide ($Re_2O_7$, Aldrich), 21.62 g of water and 229.39 ml of additional ethanol. 2.575 ml of glacial acetic acid (J. T. Baker) and 2.01 ml of 70 wt % nitric acid (EM Sciences) were added to the water mixture. The aqueous solution containing the ruthenium chloride, rhenium oxide and tin chloride was added, in a dropwise fashion, to the titanium alkoxide solution. A clear, dark-amber solution forms upon addition of the hydrolysant. No reaction was noted under $N_2$ for 72 hours. After slowly allowing the solvent to evaporate, over a period of several days, a clear, amber colored gel formed. The gel was allowed to age at room temperature for a period of 15 days. The material was placed in a stirred autoclave and extracted in $CO_2$ under supercritical conditions. $CO_2$ gas was purged over the catalyst for a period of 7 hours, at 40° C. and a pressure of 3500 psi. The material produced following the exposure was a free flowing powder. Occasionally larger, clear pieces formed which were ground to a powder. The sample was evaluated as prepared for hydrogenation reaction chemistry. No additional drying or calcination steps were performed.

Example 9

1/3 wt % Ru Incorporated in Tantalum Oxide Aerogel 30.95 ml of isobutyl alcohol (Aldrich) was combined with 20.245 g of tantalum ethoxide, $Ta(OEt)_5$ (Aldrich) in an inert atmosphere $N_2$ drybox. In a separate container, 0.0768 g of ruthenium trichloride (Aldrich) was combined with 6.30 g of water and 30.95 ml of additional isobutyl alcohol. 0.74097 ml of glacial acetic acid (J. T. Baker) and 0.5854 ml of % nitric acid (EM Scienceswere added to the water mixture. The aqueous solution containing the ruthenium chloride was added, in a dropwise fashion, to the tantalum alkoxide solution. No reaction is observed at the time of addition. A gel point could be determined approximately 30 minutes after the complete addition of the aqueous solution. A very clear, dark-colored gel formed. Aging at room temperature proceeded after 11 days prior to removal of solvent by supercritical $CO_2$. The material was placed in a stirred autoclave and extracted in $CO_2$ under supercritical conditions. $CO_2$ gas was purged over the catalyst for a period of 7 hours, at 40° C. and a pressure of 3500 psi. The material produced following the exposure was a free flowing powder. The sample was evaluated as prepared for hydrogenation reaction chemistry. No additional drying or calcination steps were performed.

Example 10

0.333 wt % Ruthenium Incorporated in a Titanium Oxide Aerogel; Soluble Rhenium Carbonyl Chloride Added During Reactor Evaluation 10 57.81 ml of ethanol (Quantum Chemical) was combined with 50.89 g of titanium n-butoxide (Aldrich) in an inert atmosphere $N_2$ drybox. In a separate container, 0.0825 g of ruthenium trichloride, $RuCl_3$ 0.2 $H_2O$ (Aldrich) was combined with 5.39 g of water and 57.81 ml of additional ethanol. 0.642 ml of glacial acetic acid (J. T. Baker) and 0.501 ml of 70% nitric acid (EM Sciences were added to the water mixture. The aqueous solution containing the ruthenium chloride was added, in a dropwise fashion, to the titanium alkoxide solution. A dark solution forms. A gel point could be determined after approximately 12 hours at room temperature. The gel is clear and dark amber in color. Aging proceeded at room temperature after five days prior to removal of solvent by supercritical $CO_2$. The material was placed in a stirred autoclave and extracted in $CO_2$ under supercritical conditions. $CO_2$ gas was purged over the catalyst for a period of 7 hours, at 40° C. and a pressure of 3500 psi. The material produced following the exposure was a free flowing powder. The sample was evaluated as prepared for hydrogenation reaction chemistry. No additional drying or calcination steps were performed.

Example 11

1/3 wt % Ru, 4/3 wt % Re in a Zirconium Oxide Aerogel; Soluble Rhenium Carbonyl Chloride Added During Reactor Evaluation 145.32 ml of isobutyl alcohol w as combined with 46.64 g of zirconium n-propoxide (70 wt % solution in n-propanol, Aldrich) in an inert atmosphere $N_2$ drybox. In a separate container, 0.087 g of ruthenium trichloride $RuCl_3$ 0.2 $H_2O$ (Aldrich) was combined with 0.217 g of rhenium trioxide ($ReO_3$), 7.18 g of water and 72 ml of additional ethanol. 0.8554 ml of glacial acetic acid (J. T. Baker) and 0.667 ml of 70 wt % nitric acid were added to the water mixture. The aqueous solution containing the ruthenium chloride and rhenium oxide was added, in a dropwise fashion, to the zirconium alkoxide solution in air with stirring. A dark brown, opaque gel forms immediately following the addition of the hydrolysant. Again at room temperature for five days prior to removal of the solvent by supercritical $CO_2$. The material was placed in a stirred autoclave and extracted in $CO_2$ under supercritical conditions. $CO_2$ gas was purged over the catalyst for a period of 7 hours, at 40° C. and a pressure of 3500 psi. The material produced following the exposure was a free flowing powder. The sample was evaluated as prepared for hydrogenation reaction chemistry. No additional drying or calcination steps were performed.

Example 12

1/3 wt % Ru, 4/3 wt % Re in a $Nb_2O_5$ Aerogel 115.62 ml of ethanol was combined with 47.52 g of niobium ethoxide (Aldrich,)in an inert atmosphere $N_2$ drybox. In a separate container, 0.14 g of ruthenium trichloride, $RuCl_3$ 0.2 $H_2O$ (Aldrich) and 0.3504 g of rhenium trioxide (Aldrich) were combined with 13.47 g of water and 115.62 ml of additional ethanol. 1.604 ml of glacial acetic acid and 1.25 ml of 70 wt % nitric were added to the water mixture. The aqueous solution containing the ruthenium chloride and rhenium trioxide was added, in a dropwise fashion, to the niobium alkoxide solution. Within minutes, a red gel (some white particle were noted). After 12 hours, the gel appeared to be dark red and clear. Aging proceeded at room temperature for eleven days prior to removal of solvent by supercritical $CO_2$. The material was placed in a stirred autoclave and extracted in $CO_2$ under supercritical conditions. $CO_2$ gas was purged over the catalyst for a period of 7 hours, at 40° C. and a pressure of 3500 psi. The material produced following the exposure was a free flowing powder. The sample was evaluated as prepared for hydrogenation reaction chemistry. No additional drying or calcination steps were performed.

Example 13

1/3 wt % Ru, 4/3 wt % Re Incorporated in a Titanium Oxide Matrix 19.05 ml of ethanol was combined with 33.92 g of titanium n-butoxide (Aldrich) in an inert atmosphere $N_2$ drybox. In a separate container, 0.0564 g of ruthenium trichloride, $RuCl_3$ 0.2 $H_2O$ (Aldrich) and 0.1404 g of rhenium trioxide (Aldrich) were combined with 7.182 g of water and 19.05 ml of additional ethanol. 0.855 ml of glacial acetic acid (Aldrich) and 0.688 ml of % nitric acid (EM Sciences) were added to the water mixture. The aqueous solution containing the ruthenium chloride and rhenium trioxide was added, in a dropwise fashion, to the niobium alkoxide solution. A gel point could be realized immediately after addition. A clear, dark amber gel formed. Within five days, removal of solvent by supercritical $CO_2$ proceeded. The material was placed in a stirred autoclave and extracted in $CO_2$ under supercritical conditions. $CO_2$ gas was purged over the catalyst for a period of 7 hours, at 40° C. and a pressure of 3500 psi. The material produced following the exposure was a free flowing powder. The sample was evaluated as prepared for hydrogenation reaction chemistry. No additional drying or calcination steps were performed.

Example 14

⅓ wt % Ru, 4/3 wt % Re in a Tantalum Oxide Matrix 61.32 ml of isobutyl alcohol was combined with 40.491 g of tantalum ethoxide (Aldrich) in an inert atmosphere $N_2$ drybox. In a separate container, 0.156 g of ruthenium trichloride, $RuCl_3$ 0.2 $H_2O$ (Aldrich) and 0.3884 g of rhenium trioxide (Aldrich) were combined with 8.978 g of water and 61.32 ml of additional ethanol. 0.8978 ml of glacial acetic acid and 0.835 ml of 70 wt % nitric acid were added to the water mixture. The aqueous solution containing the ruthenium chloride and rhenium trioxide was added, in a dropwise fashion, to the niobium alkoxide solution. The apparatus was blanketed in nitrogen. A 1 liter resin kettle, fittle with a three-neck flask was used. A clear solution obtained. The gel point was reached within 15 minutes. A clear, dark red-amber gel (perhaps slightly cloudy) was formed. Aging proceeded at room temperature for twelve days prior to removal of solvent by supercritical $CO_2$. The material was placed in a stirred autoclave and extracted in $CO_2$ under supercritical conditions. $CO_2$ gas was purged over the catalyst for a period of 7 hours, at 40° C. and a pressure of 3500 psi. The material produced following the exposure was a free flowing powder. The sample was evaluated as prepared for hydrogenation reaction chemistry. No additional drying or calcination steps were performed.

Example 15

1 wt % Ru, 4 wt % Re, in a Tantalum Oxide aerogel 123.04 ml of isobutyl alcohol was combined with 81.25 g of tantalum ethoxide, $Ta(OEt)_5$ (Aldrich) in an inert atmosphere $N_2$ drybox. In a separate container, 0.9712 g of ruthenium trichloride (Aldrich) was combined with 2.42 g of rhenium heptoxide ($Re_2O_7$, Aldrich), 18.15 g of water and 123.04 ml of additional isobutyl alcohol. 2.146 ml of glacial acetic acid (J. T. Baker) and 1.675 ml of 70 wt % nitric acid (EM Sciences) were added to the water mixture. The aqueous solution containing the ruthenium chloride and rhenium oxide was added, in a dropwise fashion, to the tantalum alkoxide solution. After several hours (72 hours), a dark brown, slightly opaque gel formed. Aging at room temperature proceeded after 12 days prior to removal of solvent by supercritical $CO_2$. The material was placed in a stirred autoclave and extracted in $CO_2$ under supercritical conditions. $CO_2$ gas was purged over the catalyst for a period of 7 hours, at 40° C. and a pressure of 3500 psi. The material produced following the exposure was a free flowing powder. The sample was evaluated as prepared for hydrogenation reaction chemistry. No additional drying or calcination steps were performed.

Procedure for the Hydrogenation of Maleic Acid

Batch Stirred Autoclave Reactor System

The reactor is a 300 cc Autoclave Engineers stirred autoclave made of Hastelloy C. The autoclave is 1.8 inch ID by 7 inch high. It is stirred with a magnetically driven stirrer, which is powered by an electric motor. The stirrer impeller is 1.25 inch OD and has 6 paddles. There are several top ports, which are connected to a pressure cell, cooling coil, a thermowell, and dip tube with a 7 micron fritted filter for removing reactor samples under process pressure and temperature. The cooling coil, thermowell and sample dip also serve as baffles to promote turbulence in the liquid. The body of the reactor is heated with a heating mantle. For a test hydrogenation, the system is operated in batch mode, with 125 g of aqueous reagent, 0.4 g catalyst, continuous hydrogen feed, 2000 psig, 250° C. and 1000 rpm agitation for 45 minutes. At the end of the run, the reactor was cooled, vented to atmospheric pressure and the products analyzed by gas chromatography and titration for acid content. Results of the hydrogenations are in Table 1.

Procedure Used for Hydrogenation of Gamma-butyrolactone (GBL) to Tetrahydrofuran/butanediol To a 5 ml autoclave was charged about 4 gm of GBL and 100 mg of catalyst. The autoclave was heated to 250° C. and maintained at 2000 psi with hydrogen for 12 hours. At the end of the run, the reactor was cooled, vented to atmospheric pressure and the products analyzed by gas chromatography. Results of the hydrogenations are in Table 2.

What is claimed is:

1. A catalyst precursor composition comprising catalytic species dispersed in and distributed throughout a high surface area matrix, wherein the high surface area matrix is an inorganic oxide network, prepared by a sol-gel route, wherein the inorganic oxide is selected from the group consisting of titanium oxide, niobium oxide, tantalum oxide, zirconium oxide, and oxyhydroxide analogs thereof and wherein, the catalytic species is selected from the group consisting of ruthenium and palladium and further comprising a promoter selected from the group consisting of Rhenium, Molybdenum and Tin, and mixtures thereof.

2. A catalyst composition comprising the reduced form of the catalyst precursor composition of claim 1.

* * * * *